United States Patent
Zhao et al.

(10) Patent No.: US 10,178,368 B2
(45) Date of Patent: Jan. 8, 2019

(54) STEREO IMAGING SYSTEM WITH AUTOMATIC DISPARITY ADJUSTMENT FOR DISPLAYING CLOSE RANGE OBJECTS

(71) Applicant: Intuitive Surgical Operations, Inc., Sunnyvale, CA (US)

(72) Inventors: Wenyi Zhao, Mountain View, CA (US); Catherine J. Mohr, Mountain View, CA (US); Simon P. DiMaio, San Carlos, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 251 days.

(21) Appl. No.: 14/053,021

(22) Filed: Oct. 14, 2013

(65) Prior Publication Data

US 2014/0111623 A1 Apr. 24, 2014

Related U.S. Application Data

(60) Provisional application No. 61/717,443, filed on Oct. 23, 2012.

(51) Int. Cl.
 *H04N 13/128* (2018.01)
 *H04N 13/239* (2018.01)

(52) U.S. Cl.
 CPC ......... *H04N 13/128* (2018.05); *H04N 13/239* (2018.05)

(58) Field of Classification Search
 CPC ........... H04N 13/0022; H04N 13/0239; H04N 13/0296; H04N 13/0055; H04N 2013/0081; G06T 7/0022
 See application file for complete search history.

(56) References Cited

U.S. PATENT DOCUMENTS

| | | | | |
|---|---|---|---|---|
| 5,577,130 A | * | 11/1996 | Wu | G06K 9/20 348/E13.008 |
| 5,993,001 A | * | 11/1999 | Bursell | G06F 19/321 348/E13.014 |
| 6,512,892 B1 | * | 1/2003 | Montgomery | H04N 13/0011 348/E13.008 |
| 6,720,988 B1 | | 4/2004 | Gere et al. | |
| 6,798,406 B1 | * | 9/2004 | Jones | H04N 13/0011 345/419 |
| 7,240,075 B1 | * | 7/2007 | Nemirofsky | G06F 17/30277 |
| 8,184,880 B2 | | 5/2012 | Zhao et al. | |
| 2005/0100192 A1 | * | 5/2005 | Fujimura | G06K 9/00369 382/103 |
| 2007/0156017 A1 | | 7/2007 | Lamprecht et al. | |

(Continued)

OTHER PUBLICATIONS

Co-pending U.S. Appl. No. 61/554,741, filed Nov. 2, 2011.

(Continued)

*Primary Examiner* — Mohammed Jebari

(57) ABSTRACT

A stereo imaging system comprises a stereoscopic camera having left and right image capturing elements for capturing stereo images; a stereo viewer; and a processor configured to modify the stereo images prior to being displayed on the stereo viewer so that a disparity between corresponding points of the stereo images is adjusted as a function of a depth value within a region of interest in the stereo images after the depth value reaches a target depth value.

18 Claims, 7 Drawing Sheets

(56) References Cited

U.S. PATENT DOCUMENTS

| | | | | |
|---|---|---|---|---|
| 2007/0248260 A1* | 10/2007 | Pockett | ............. | H04N 13/0425 382/154 |
| 2008/0112616 A1* | 5/2008 | Koo | ................... | H04N 13/0022 382/171 |
| 2010/0166323 A1* | 7/2010 | Zhao | ..................... | G06T 7/0028 382/218 |
| 2011/0228051 A1* | 9/2011 | Dedeoglu | .......... | H04N 13/0022 348/46 |
| 2011/0292190 A1* | 12/2011 | Kim | ................... | H04N 13/0022 348/54 |
| 2012/0098938 A1* | 4/2012 | Jin | ..................... | H04N 13/0271 348/47 |
| 2012/0120202 A1* | 5/2012 | Yoon | ................. | H04N 13/0239 348/49 |
| 2012/0176371 A1* | 7/2012 | Morifuji | ............ | G02B 27/2214 345/419 |
| 2012/0249529 A1* | 10/2012 | Matsumoto | ........ | H04N 13/0497 345/419 |
| 2012/0302828 A1* | 11/2012 | Toledo-Crow | ......... | A61B 18/24 600/108 |
| 2013/0063572 A1* | 3/2013 | Ramachandra | .... | H04N 13/0018 348/47 |
| 2013/0249874 A1* | 9/2013 | Song | .................. | H04N 13/0022 345/204 |
| 2014/0092208 A1* | 4/2014 | Zou | ...................... | H04N 19/597 348/43 |

OTHER PUBLICATIONS

Scharstein D., et al., "High-Accuracy Stereo Depth Maps Using Structured Light," IEEE Computer Society Conference on Computer Vision and Pattern Recognition, 2003, vol. 1, pp. 195-202.

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.

* cited by examiner

STEREO IMAGING SYSTEM WITH AUTOMATIC DISPARITY ADJUSTMENT FOR DISPLAYING CLOSE RANGE OBJECTS

FIELD OF THE INVENTION

The present invention generally relates to stereo imaging systems. In particular, it relates to a stereo imaging system, and a method implemented therein, for providing automatic disparity adjustment for displaying close range objects.

BACKGROUND OF THE INVENTION

A stereo imaging system includes a stereoscopic camera which has two image capturing elements for capturing left and right stereo images. Details for such a stereo imaging system may be found, for example, in U.S. Pat. No. 6,720,988 entitled "Stereo Imaging System and Method for Use in Telerobotic System."

FIG. 1 illustrates a schematic of the stereo geometry for two image capturing elements, e.g., left and right optical lens 101, 102, which are separated by a baseline distance "b". Left and right image planes 121, 122 are shown at a focal length "f" (i.e., a depth at which the left and right images are focused). The image planes 121, 122 represent stereo images that are captured by the lens 101, 102 and are bounded by their fields of view. The focal length may be adjusted within a focusing range, but the baseline distance is fixed for the stereoscopic camera.

A point "P" at a depth "Z" from the lens 101, 102 is seen at different points on the image planes 121, 122. In particular, the point "P" is projected at a position "d1" on the left image plane 121 and projected at a position "d2" on the right image plane 122. The difference or disparity "D" between the two positions "d2" and "d1" can be determined from the following well-known relationship:

$$\frac{D}{b} = \frac{f}{z} \quad (1)$$

Thus, as the depth "Z" gets smaller and smaller, the disparity "D" gets larger and larger.

Stereo images captured by the stereoscopic camera are displayed on a stereo viewer. As an example, the stereo viewer may have left and right display screens upon which left and right stereo images are respectively displayed. The stereo viewer in this case, may also have left and right eyepieces through which a user places his/her left and right eyes to respectively view the left and right display screens.

When objects are viewed at very close range by the stereoscopic camera, even after or while adjusting the camera focus, the user may have difficulty fusing his/her eyes on an image of the object being displayed on the stereo viewer due to the large disparity "D" between corresponding points on the left and right display screens. In addition, after the camera focus control has reached the end of its range, a practical limit may be placed on how close an object may be viewed relative to the stereoscopic camera.

To address this problem, another stereoscopic camera with a smaller baseline "b" (i.e., closer spacing between the image capturing elements) may be used at very close range to reduce the disparity "D" between displayed stereo images and consequently, allow a user to comfortably see the stereo images being displayed on the stereo viewer. However, the use of multiple stereoscopic cameras with different baselines adversely adds to the cost of the stereo imaging system and increases the difficulty of its use by an operator.

OBJECTS AND SUMMARY OF THE INVENTION

Accordingly, one object of one or more aspects of the present invention is a stereo imaging system, and method implemented therein, that provides both normal range and close range viewing without requiring two or more stereoscopic cameras with different baseline dimensions.

Another object of one or more aspects of the present invention is an imaging system, and method implemented therein, that provides both normal range and close range viewing without requiring a stereoscopic camera with an adjustable baseline dimension.

Another object of one or more aspects of the present invention is an imaging system, and method implemented therein, that provides both normal range and close range viewing with automatic disparity adjustment for user comfort and convenience.

These and additional objects are accomplished by the various aspects of the present invention, wherein briefly stated, one aspect is an imaging system comprising: a stereoscopic camera having left and right image capturing elements for capturing stereo images; a stereo viewer; and a processor configured to modify the stereo images prior to being displayed on the stereo viewer so that a disparity between corresponding points of the stereo images is adjusted as a function of a depth value within a region of interest in the stereo images after the depth value reaches a target depth value.

Another aspect is a method for automatically adjusting stereo images to be displayed on a stereo viewer for both normal and close range viewing, the method comprising: modifying the stereo images prior to being displayed on the stereo viewer so that a disparity between corresponding points of the stereo images is adjusted as a function of a depth value within a region of interest in the stereo images after the depth value reaches a target depth value.

Additional objects, features and advantages of the various aspects of the present invention will become apparent from the following description of its preferred embodiment, which description should be taken in conjunction with the accompanying drawings.

DETAILED DESCRIPTION

Figure 1:
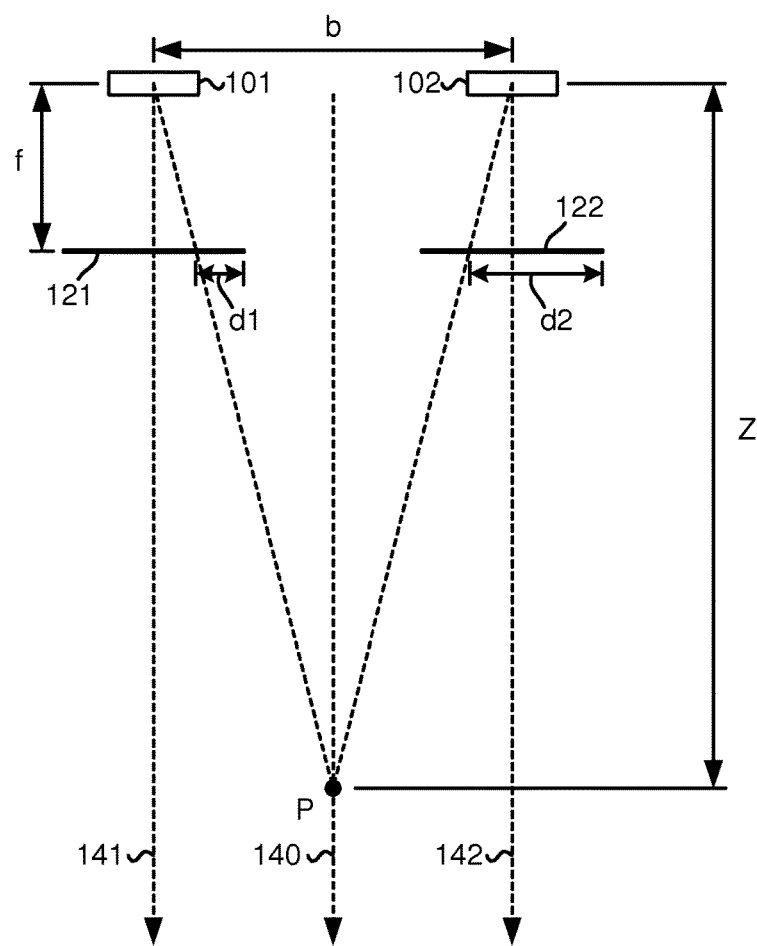
FIG. 1 illustrates a schematic of the stereo geometry for two image capturing elements of a stereo imaging system.
Figure 2:
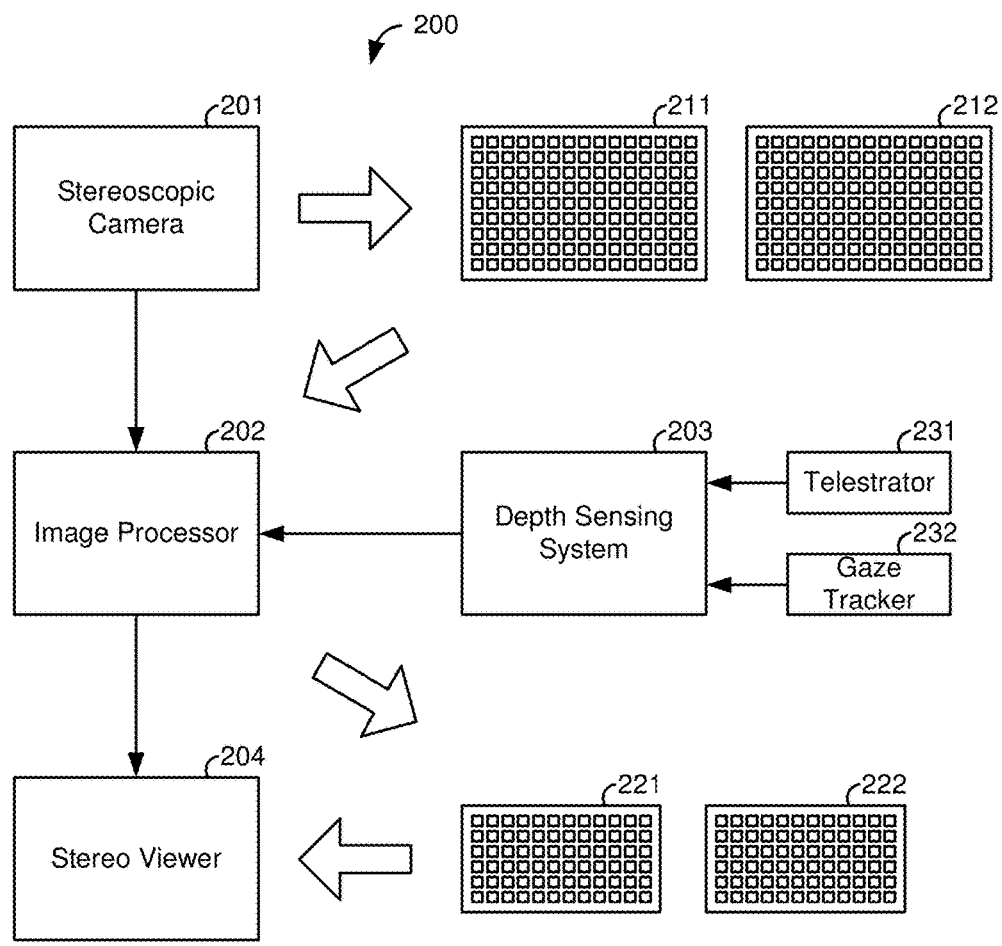
FIG. 2 illustrates a block diagram of a stereo imaging system utilizing aspects of the present invention.

FIG. 2 illustrates, as an example, a block diagram of a stereo imaging system 200 in which a method 300 utilizing the invention is implemented. A stereoscopic camera 201 is preferably a high-definition digital stereo camera which generates a video stream of stereo images captured at a frame rate of the camera, such as thirty frames per second. Each frame of stereo images includes a left stereo image 211 and a right stereo image 212 which has been captured at a high resolution, such as 1920×1080 pixels. An image processor 202 modifies the stereo images received from the stereoscopic camera 201 according to the method 300. A stereo viewer 204 has left and right display screens for respectively displaying the modified left stereo image 221 and modified right stereo image 222 received from the image processor 202. The resolution of the left and right display screens is typically a lower resolution, such as 1280×1024 pixels, than that of the camera 201.

A depth sensing system 203 determines depth values for a region of interest in the stereo images and provides the depth value to the image processor 202 so that it may be used by the method 300. The region of interest may be predefined as a default region in the stereo images, for example, the center region, or it may be user defined. As an example, the user may define the region of interest using a telestrator 231, so that the user may draw a region of interest over one of the left and right stereo images being displayed at the time on the telestrator 231. Details on such a telestration system may be found, for example, in U.S. 2007/0156017 entitled "Stereo Telestration for Robotic Surgery", which is incorporated herein by reference. Alternatively, the user may define the center of a region of interest using a gaze tracking unit 232 which tracks the user's gaze point on one or both of the display screens of the stereo viewer 204. Details for such a gaze tracking system may be found, for example, in U.S. Application No. 61/554,741 entitled "Method and System for Stereo Gaze Tracking". The location and/or dimensions of the region of interest may be predefined or definable by the user using any conventional means such as a Graphical User Interface (GUI). Regardless of how the region of interest is defined, it may be displayed for the convenience of the user on the stereo viewer 204 at its proper location as an overlay to any three-dimensional objects or surface topology being displayed therein at the time. The overlay may be a three-dimensional overlay at the same depths and following the contour of the underlying objects or surface topology or it may be a two-dimensional overlay floating over the underlying objects or surface topology at a specified depth value.

The depth sensing system 203 may determine the depth values for the region of interest in the stereo images using one or a combination of known methods. As an example, a structured light technique may be used in which a known light pattern is projected onto a three-dimensional scene and the relative light intensities on the scene tracked to derive a depth map for the scene. See, e.g., Daniel Scharstein and Richard Szeliski, "High-Accuracy Stereo Depth Maps Using Structured Light," IEEE Computer Society Conference on Computer Vision and Pattern Recognition (CVPR 2003), vol. 1, pages 195-202, Madison, Wis., June 2003. As another example, the depth value may be determined by determining corresponding points in stereo images using a robust sparse image matching algorithm, determining disparities between the corresponding points, and converting the disparities to depths using a predetermined disparity to depth mapping. See, e.g., U.S. Pat. No. 8,184,880 entitled "Robust Sparse Image Matching for Robotic Surgery", which is incorporated herein by reference. As yet another example, a laser range finder may be used for determining depth values of a three-dimensional scene. The depth value may be an average depth value for the surface topology appearing in the region of interest. When tools, which are being used to interact with objects of the surface topology, appear above the surface topology, depth values for the tools which occlude part of the surface topology may be included or excluded from the calculation.

Figure 3:
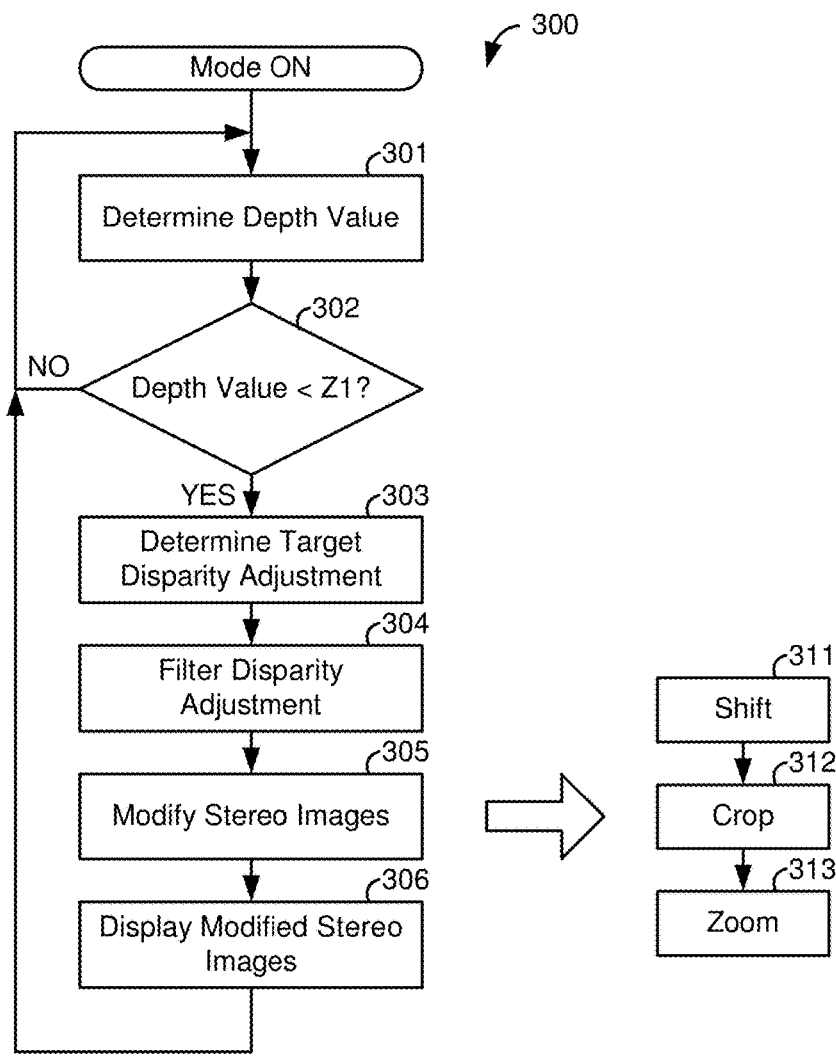
FIG. 3 illustrates a flow diagram of a method for providing automatic disparity adjustment for both normal and close range viewing in a stereo viewer of a stereo imaging system utilizing aspects of the present invention.

FIG. 3 illustrates, as an example, a flow diagram of a method 300 for modifying stereo images captured at close range to aid a user to fuse his/her eyes on objects in the modified stereo images when they are displayed on a stereo viewer. Typically, the method may be used while the user is adjusting the distance of the camera lens from one or more objects comprising a surface topology. Manual or auto focus may be employed during the distance adjustment. The method 300 is preferably implemented as program code executed by the image processor 202. In this example, the method is only active when the mode is turned ON, giving a user the option to turn OFF the mode and not use the method. Alternatively, the mode may always be ON, giving the user no option to turn it OFF. To help describe the method, FIGS. 4, 5, 6a-6d, and 7a-7c are provided.

In block 301, the method determines a depth value for a region of interest appearing in a current frame in a video stream of stereo images being received from a stereoscopic camera. The depth value is determined, for example, by the depth sensing system 203 as previously described.

Figure 4:
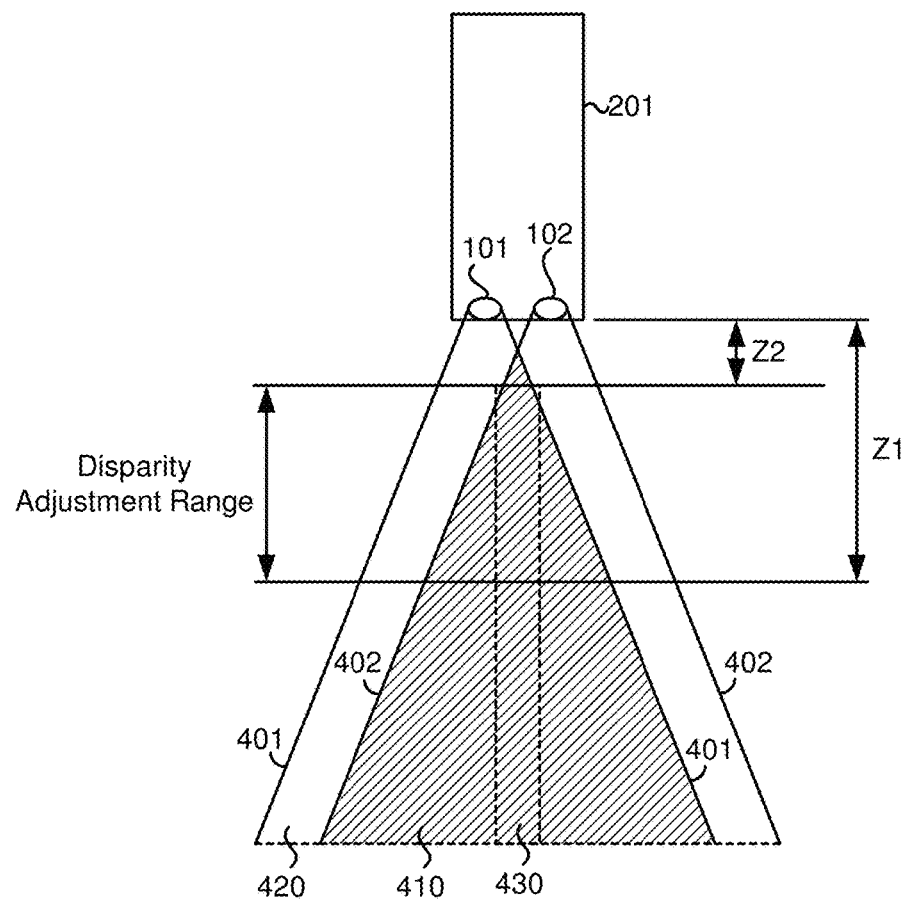
FIG. 4 illustrates a schematic of a region of interest in a stereo view of a stereo imaging system utilizing aspects of the present invention.
Figure 5:
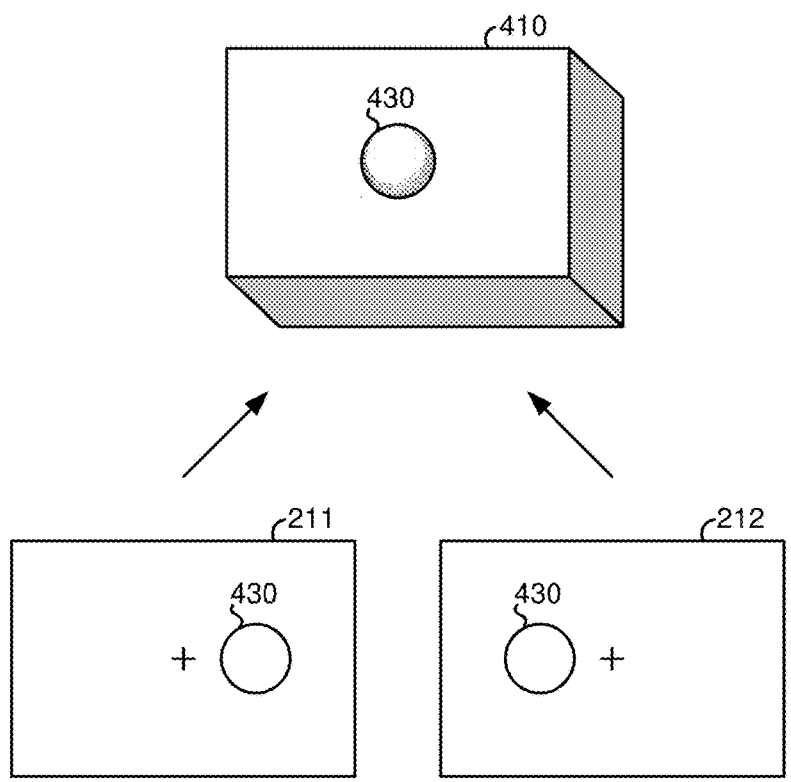
FIG. 5 illustrates a schematic of a stereo view constructed from a pair of stereo images in a stereo imaging system utilizing aspects of the present invention.

As an example of a region of interest, FIG. 4 illustrates a region of interest 430 which is cylindrically shaped and extends within the stereo view 410 to a surface topology (not shown). The stereo view 410 is the intersection of the fields of view 401, 402 of the image capturing elements 101, 102. As shown in FIG. 5, the region of interest 430 is centered within the stereo view 410, but offset in the left and right stereo images 211, 212 by a disparity corresponding to the average depth value of the surface topology. Note that the area 420 outside the stereo view 410 is only viewable in monovision since it is viewable by only the image capturing element 101.

In block 302, a determination is made whether the depth value is less than a first threshold value Z1 (as shown in FIG. 4). The first threshold value Z1 is a depth value at which it becomes difficult for a user viewing the stereo images on the stereo viewer to visually fuse the stereo images with his/her eyes. Typically, this depth value is a function of the baseline distance "b" between the image capturing elements of the stereoscopic camera. It may also be a function of the focal lengths and fields of view of the image capturing elements. As an example, a depth value of 5 centimeters has been empirically determined as such a point for a medical robotic system employing a stereoscopic endoscope. Thus, the first threshold value Z1 may be empirically determined and pre-programmed into the stereo imaging system as a default value. Additionally, or alternatively, it may be specified and/or altered by the operator in a conventional manner to accommodate specific user preferences.

If the determination in block 302 is NO, then the method loops back to block 301 to process a next frame in the video stream of stereo images without any disparity adjustment so that the stereo imaging system operates in a normal viewing mode.

On the other hand, if the determination in block 302 is YES, then in block 303, the method determines a target disparity adjustment. It may do this, for example, by using either an empirically determined equation which is a function of depth values or using an empirically determined look-up table which is indexed by depth values. When using the look-up table, linear or best curve fitting interpolation between look-up table values may also be performed as necessary.

To empirically determine the target disparity adjustment for a depth value, the left and right stereo images may be shifted in horizontal directions to reduce the disparity between them until a user viewing the stereo images on a stereo viewer is able to comfortably fuse his/her eyes on the stereo images being displayed at the time. As the depth value increasingly becomes smaller, more horizontal shifting may be required to achieve comfortable fusing of stereo images. Thus, target disparity adjustments as a function of depth value may be empirically determined in this manner starting with the target depth value Z1 and ending with a minimum depth value Z2 (as shown in FIG. 4). The minimum depth value Z2 is reached when the intersection of the fields of view of the two image capturing elements becomes too small for practical stereo viewing and/or too small to accommodate the horizontal pixel shifting for the target disparity adjustments. Note that in determining the target disparity adjustments in this manner, conversion between the low resolution display screens of the stereo viewer and the high resolution stereo images is implicitly accommodated. As an example of an empirically determined function for target disparity adjustments, a medical robotic system employing a stereoscopic endoscope has been found to have satisfactory results with a target disparity adjustment which is linearly scaled from 24 pixels at 5 cm (the target depth value) to 250 pixels at 2 cm (the minimum depth value). As with the first threshold depth value, the minimum depth value Z2 may be pre-programmed into the stereo imaging system or it may be user specified and/or user alterable using conventional human/computer interaction means. Once the minimum depth value is reached, the target disparity adjustment may remain fixed as the depth value further becomes smaller. Alternatively, the stereo imaging system may restrict the depth value from becoming less than the minimum depth value.

In block 304, the method optionally filters the target disparity adjustment to avoid an abrupt change and/or jitter in the stereo images to be displayed on the stereo viewer. As an example, a maximum pixel shift per frame may be specified, such as 1-3 pixels per frame. The use of low pass filters, moving averages, and other well known smoothing techniques may also be used.

In block 305, the method modifies the stereo images. In modifying the stereo images, the method takes into account the target disparity adjustment determined in block 303, the optional filtering performed in block 304, and the respective resolutions of the stereo images and the left and right display screens of the stereo viewer. The modification may be performed using the sub-blocks 311, 312, 313.

In a first embodiment, as shown in FIGS. 6a-6d, all three sub-blocks 311-313 are used.

Figure 6A:
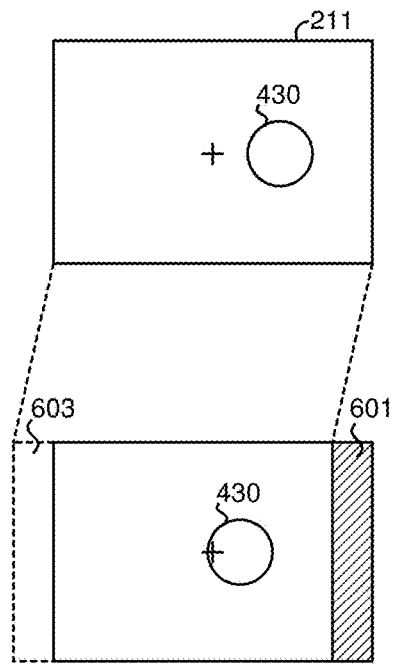
FIGS. 6a-6d schematically illustrate steps performed in a first embodiment of a method for modifying stereo images as part of the method of FIG. 3 utilizing aspects of the present invention.
Figure 6B:
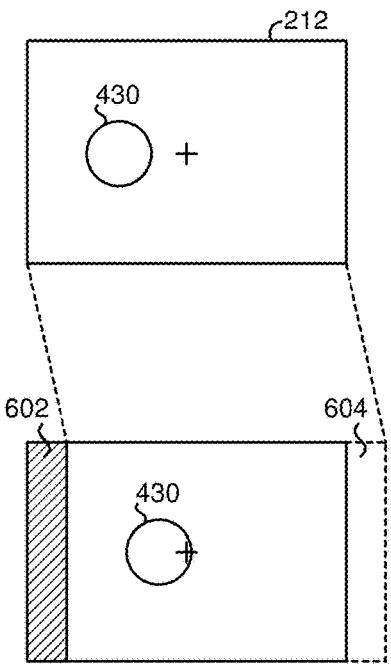

In sub-block 311, a shift step may be performed such as shown in FIGS. 6a-6b. In this case, all pixels are shifted horizontally in both the left and right stereo images 211, 212 so as to reduce the disparity between corresponding points by the filtered target disparity adjustment. As a result, shifted-out pixel columns 603, 604 are not used (e.g., discarded) and shifted-in pixel columns 601, 602 are filled with filler pixel values such as a specific color. A plus sign "+" is shown in the center of each stereo image to provide a reference point.

Figure 6C:
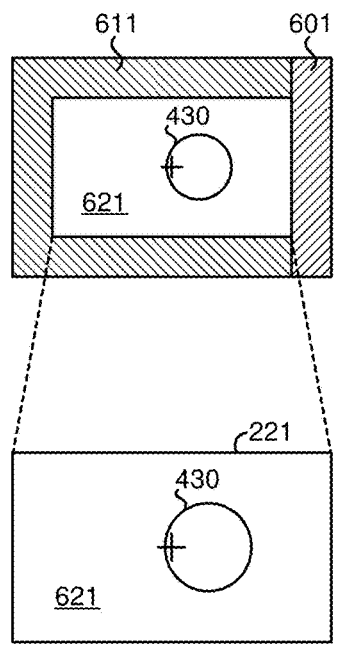

In sub-block 312, an image cropping step is performed such as shown in FIG. 6c. In this first embodiment, the shifted-in pixel columns 601, 602 are cropped out along with areas 611, 612 surrounding areas 621, 622, which will be described further with respect to the following zooming step. Note that the plus sign "+" is in the same place before and after the cropping, because the same amount is cropped off each pair of opposing ends.

Figure 6D:
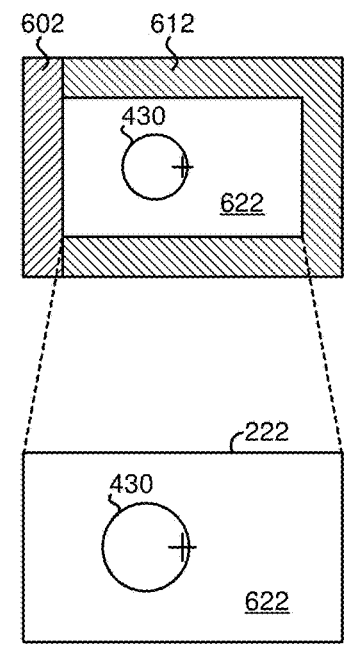

In sub-block 313, an image zooming step is performed such as shown in FIG. 6d. In this example, the areas 621, 622 remaining after the cropping step of sub-block 312 are zoomed-out so that the resulting left and right stereo images 221, 222 have the same resolutions as their respective left and right display screens of the stereo viewer. With this in mind, the areas 621, 622 are determined so that when zoomed-out, proper filtered disparity adjustments result in the resulting left and right stereo images 221, 222 which are to be displayed in the stereo viewer.

Figure 7A:
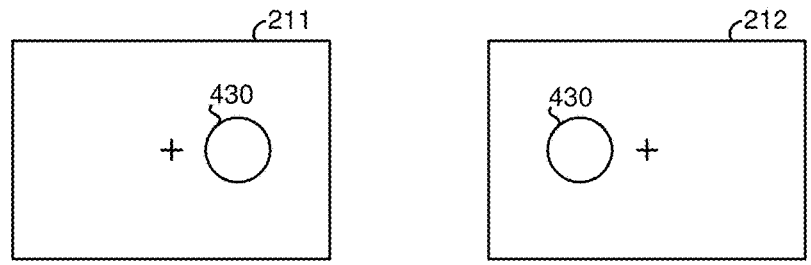
FIGS. 7a-7c schematically illustrate steps performed in a second embodiment of a method for modifying stereo images as part of the method of FIG. 3 utilizing aspects of the present invention.
Figure 7B:
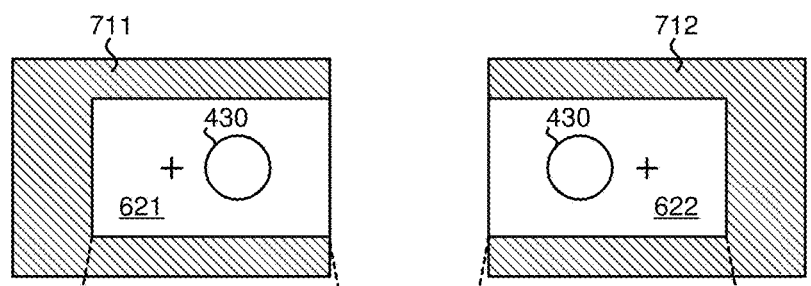
Figure 7C:
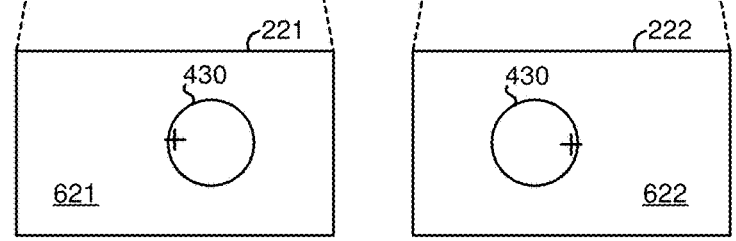

In a second embodiment, as shown in FIGS. 7a-7c, only sub-blocks 312 and 313 are used since sub-block 311 is eliminated with a modification to sub-block 312.

In modified sub-block 312, the stereo images 211, 212 are cropped so as to directly result in the areas 621, 622, which are zoomed out as previously described with respect to sub-block 313.

Finally, in block 306, the method displays the modified stereo images on the left and right display screens of the stereo viewer. The method then loops back to block 301 to process the next frame of stereo images.

Although the various aspects of the present invention have been described with respect to a preferred embodiment, it will be understood that the invention is entitled to full protection within the full scope of the appended claims.

What is claimed is:

1. An imaging system comprising:
    a stereoscopic camera having left and right image capturing elements for capturing stereo images;
    a depth sensing system providing a depth value for a region of interest in the stereo images, the depth value indicating a distance from the stereoscopic camera to a three-dimensional scene whose image is captured within the region of interest by the stereoscopic camera;
    a stereo viewer; and
    a processor programmed to:
        receive information of the stereo images;
        receive the depth value from the depth sensing system;
        determine whether the depth value is less than a target depth value, wherein the target depth value approximates a nearest distance from the stereoscopic camera to the three-dimensional scene at which stereo images captured by the stereoscopic camera become difficult for a user who is viewing the stereo images on the stereo viewer, to visually fuse the stereo images being displayed on the stereo viewer; and
        conditioned upon the depth value being less than the target depth value, modify the stereo images prior to being displayed on the stereo viewer according to a disparity adjustment so that a disparity between corresponding points of the stereo images is adjusted as a function of the depth value, wherein the function of the depth value provides no disparity adjustment when the depth value is greater than the target depth value and provides a constant disparity adjustment when the depth value is less than a minimum depth value, wherein the constant disparity adjustment is determined according to the function of the depth value with the depth value being equal to the minimum depth value.

2. The imaging system of claim 1, wherein the function of the depth value increases the disparity adjustment in terms of horizontal shifting of pixels in the stereo images so as to reduce the disparity between corresponding points of the stereo images prior to the stereo images being displayed on the stereo viewer, as the depth value decreases from the target depth value to the minimum depth value.

3. The imaging system of claim 1, wherein the target depth value is empirically determinable.

4. The imaging system of claim 1, wherein the depth sensing system provides the depth value while the distance from the stereoscopic camera to the three-dimensional scene is being adjusted by a user viewing the stereo viewer.

5. The imaging system of claim 1, wherein the depth sensing system determines the depth value as an average depth for the region of interest.

6. The imaging system of claim 1, wherein the region of interest is one of a region centered in the stereo images and a user selected region in the stereo images.

7. The imaging system of claim 6, wherein the user selected region of interest corresponds to one of: an area specified by a user interacting with a telestrator; and an area centered at a gaze point of a user on at least one of the displayed stereo images.

8. The imaging system of claim 1, wherein the stereoscopic camera is part of a stereoscopic endoscope system, and wherein the target depth value is 5 centimeters.

9. The imaging system of claim 1, wherein the depth sensing system determines the depth value by considering depth values of all objects appearing in the region of interest except depth values for all tools which appear in the region of interest and are being used to interact with one or more of the objects.

10. The imaging system of claim 1, wherein the processor is programmed to modify the stereo images prior to being displayed on the stereo viewer by: cropping outer edges of the stereo images so that the disparity between corresponding points of the stereo images is reduced when the depth value is less than the target depth value; and adjusting the cropped stereo images so as conform to a resolution of the stereo viewer before displaying the adjusted, cropped stereo images on the stereo viewer.

11. The imaging system of claim 10, wherein the processor is programmed to shift pixels of the stereo images so as to effectively reduce the disparity between corresponding points in left and right images of the stereo images and result in a vertical band of filler pixel columns in each of the left and right images of the stereo images as part of cropping outer edges of the stereo images.

12. The imaging system of claim 11, wherein the number of pixel columns shifted in a horizontal direction is determined by the processor using the function of the depth value.

13. The imaging system of claim 11, wherein the stereo Images are displayed at a rate of frames per second on the stereo viewer so movement of a tool appearing in the stereo images appears continuous, and wherein the number of pixel columns shifted in a horizontal direction is limited to a number of pixel columns being shifted in the horizontal direction for each frame to avoid jittering.

14. The imaging system of claim 11, wherein the processor is programmed to crop the stereo images by cropping the shifted pixels of the stereo images so as to eliminate the vertical band of filler columns in each of the left and right images of the stereo images and zoom the cropped stereo images so as to fill the left and right screens of the stereo viewer.

15. A method for automatically adjusting stereo images to be displayed on a stereo viewer for both normal and close range viewing, the method comprising:
receiving, at a processor, information of stereo images captured by a stereoscopic camera having left and right image capturing elements;
receiving, at the processor from a depth sensing system, a depth value for a region of interest in the stereo images, the depth value indicating a distance from the stereoscopic camera to a three-dimensional scene whose image is captured within the region of interest by the stereoscopic camera;
determining, by the processor, whether the depth value is less than a target depth value, wherein the target depth value approximates a nearest distance from the stereoscopic camera to the three-dimensional scene at which stereo images captured by the stereoscopic camera become difficult for a user, who is viewing the stereo images on the stereo viewer, to visually fuse the stereo images being displayed on the stereo viewer; and
conditioned upon the depth value being less than the target depth value, modifying, by the processor, the stereo images prior to being displayed on the stereo viewer according to a disparity adjustment so that a disparity between corresponding points of the stereo images is adjusted as a function of the depth value,
wherein the function of the depth value provides no disparity adjustment when the depth value is greater than the target depth value and provides a constant disparity adjustment when the depth value is less than a minimum depth value, wherein the constant disparity adjustment is determined according to the function of the depth value with the depth value being equal to the minimum depth value.

16. The method of claim 15, wherein modifying, by the processor, the stereo images prior to being displayed on the stereo viewer according to a disparity adjustment so that a disparity between corresponding points of the stereo images is adjusted as a function of the depth value, comprises: cropping outer edges of the stereo images so that the disparity between corresponding points of the stereo images is reduced; and adjusting the cropped stereo images so as conform to a resolution of the stereo viewer before displaying the adjusted, cropped stereo images on the stereo viewer.

17. The method of claim 15, wherein modifying, by the processor, the stereo images prior to being displayed on the stereo viewer according to a disparity adjustment so that a disparity between corresponding points of the stereo images is adjusted as a function of the depth value, comprises: shifting pixels of the stereo images so as to effectively reduce the disparity between corresponding points in left and right images of the stereo images and result in a vertical band of filler pixel columns in each of the left and right images of the stereo images as part of the cropping of the stereo images, wherein the number of pixel columns shifted in a horizontal direction is a function of the depth value; cropping the stereo images by cropping the shifted pixels of the stereo images so as to eliminate the vertical band of filler pixel columns in each of the left and right images of the stereo images; and zooming the cropped stereo images so as to fill the left and right screens of the stereo viewer.

18. The method of claim 15, further comprising: determining, by the depth sensing system, the depth value while the distance from the stereoscopic camera to the three-dimensional scene is being adjusted by a user viewing the stereo viewer.

* * * * *